United States Patent Office 3,154,610
Patented Oct. 27, 1964

3,154,610
PROCESS OF WET SPINNING POLYAMIDES AND PREVENTION OF GEL FORMATION
Russell Owens Denyes, Maplewood, N.J., assignor to Celanese Corporation of America, New York, N.Y., a corporation of Delaware
No Drawing. Filed May 31, 1961, Ser. No. 113,609
6 Claims. (Cl. 264—169)

This invention relates to an improved process for the formation of shaped articles such as filaments of condensation polymers.

There has been proposed in application Serial No. 83,981, filed January 23, 1961, by Cipriani, the entire disclosure of which is incorporated herein by reference, a method for the formation of shaped articles of condensation polymers containing repeating —NRCO— groups where R is hydrogen or a monovalent organic radical, utilizing a solution of the polymer in concentrated sulfuric acid. Although the method described in the foregoing application is generally satisfactory, there are cases where it is desirable to improve the stability of the shaping process, and/or to improve the mechanical properties of the resulting shaped article. While it is not desired to be limited to any theory, it is believed that a lower degree of stability of the shaping process and/or a lower level of mechanical properties in the shaped article than is desired may be due to the presence of insoluble gels in the solution used for shaping. These gels are difficult to extrude through the shaping orifice which they tend to plug up and result in the formation of weak and nonuniform areas in the extruded article due to the fact that they do not form a coherent structure with the rest of the shaped article. In the case of the wet spinning of filaments, the presence of these gels in substantial amount may contribute to spinning instability by causing the frequent rupture of the filaments which are formed, and in some cases may in effect prevent the formation of useful filaments. While it is possible to substantially reduce the presence of these gels by methods such as filtration, these methods are often expensive and difficult to carry out.

It is an object of this invention to provide an improved process of forming shaped articles of condensation polymers containing repeating —NRCO— groups where R is hydrogen or a monovalent organic radical. It is a further object of this invention to provide an improvement in the process of shaping said condensation polymers into useful shaped articles utilizing a solution of the polymer in concentrated sulfuric acid. It is a still further object of the invention to provide a highly stable process of obtaining shaped articles of improved mechanical properties from a solution of said polymer in concentrated sulfuric acid. It is still a further object of the invention to provide a process of shaping said condensation polymer utilizing a solution of the polymer in concentrated sulfuric acid whereby filtration difficulties are substantially eliminated or minimized. Other objects will be apparent from the following detailed description and claims.

In accordance with one aspect of the invention, a solution in concentrated sulfuric acid of a condensation polymer containing repeating —NRCO— groups as an integral part of the polymer chain, where R is hydrogen or a monovalent organic radical, e.g., a hydrocarbon radical such as lower alkyl, is kept at an elevated temperature for a period of time prior to being formed into a shaped article such as a filament. The solution may be kept at a temperature, for example, in the range of 70 to 100° C. for a period in the range of 1 minute to 1 week, preferably 30 minutes to 5 hours. The solution may be maintained at the desired temperature using any convenient heating means, e.g. electrical heating elements, fuel combustion, indirect heat exchange using heat exchange coils, etc. The solution is preferably stirred while heating although this is not absolutely necessary. In addition to carrying out the heat treatment on a solution prepared at room temperature the heat treatment may be incorporated with the dissolving procedure e.g. the polymer may be added to hot acid or the polymer may be added to acid at room temperature and the mass heated up while the polymer is dissolving. A solution which is heat treated in accordance with this invention in general has less of a tendency to plug the pores of a standard filtering medium than the same solution which is not heat treated.

The condensation polymers to which the process of this invention may be applied are, for example, the polyamides proper, e.g., the nylons, wherein the —NCRO— groups are attached to carbon atoms on each side, the polyurethanes which contain repeating —NRCOO— groups, and the polyureas which contain repeating

—RNCONR— groups. While the process may be beneficially carried out on solutions of polymers such as polyhexamethylene adipamide and polycaprolactam, it is particularly suitable for the shaping of the "difficulty meltable" polymers, i.e., the polymers which cannot easily be shaped using melt extrusion techniques because they tend to seriously degrade and/or further polymerize to a useless infusible mass when heated to a temperature sufficient to melt them. These polymers include, for example, high melting polymers, e.g. polyamides proper melting above 275° C. and in general polymers having cyclic groups, e.g., meta- or para-phenylene, cycloalkylene groups such as 1,4-cyclohexylene and/or heterocyclic groups such as piperazylene or an alkyl substituted piperazylene group e.g. 2-lower alkyl piperazylene such as 2-methyl piperazylene or 2,5-di-lower alkyl piperazylene such as 2,5-dimethyl piperazylene, as an integral part of the polymer chain.

Some contemplated polyamides are those, for example, which have repeating structural units of the formula

—NR—Y—NR′—CO—Y′—CO— which result from the condensation of a dicarboxylic acid or a derivative thereof e.g., a salt, acyl halide, or ester of such an acid, with a diamine, wherein the R's, which may be the same or different, are hydrogen or monovalent organic radicals e.g. lower alkyl such as methyl or ethyl, and the Y's, which also may be the same or different, are divalent organic radicals such as alkylene e.g., ethylene, tetramethylene or hexamethylene, arylene such as para- and meta-phenylene, para- and meta-xylene, and para- and meta-diethylene benzene, cycloalkylene such as 1,4-cyclohexylene and divalent heterocyclic radicals such as those derived from piperazine, and alkyl and di-alkyl piperazines, e.g. 2-methyl- and 2,5-dimethyl piperazines and 2-ethyl and 2,5-diethyl piperazines, wherein the open bonds are attached to the nitrogen atoms, and wherein the chemical structure of the polymer and/or the polymerization technique used is such that a relatively high melting polymer is obtained.

An important group of polyamides within the above group are those in which Y and/or Y′ is or contains a para- or meta-phenylene radical or a 1,4-cyclohexylene radical, and particularly important are condensation products of a diamine and terephthalic acid or a derivative of terephthalic acid e.g. terephthalyl chloride or a dialkyl terephthalate. Some specific polymers within this latter group are poly (polymethylene) terephthalamides wherein the polymethylene groups contain 2 to 10 carbon atoms, e.g. polyhexamethylene terephthalamide, polyoctamethylene terephthalamide, polytetramethylene terephthalamide, polyethylene terephthalamide, and polypiperazylene terephthalamide. Other polyterephthalamides are poly-o-, m-, and p-phenylene terephthalamides, poly-o-, m-, and p-xylene terephthalamides and poly-o-, m-, and p-diethylene-phenylene terephthalamides, the latter produced, for example, by condensing an ester-forming derivative of terephthalic acid with para-bis (betaaminoethyl) benzene. The polyterephthalamides when shaped in accordance with the invention exhibit a particularly good combination of properties, e.g. mechanical properties such as tenacity and elongation, water insensitivity as indicated by high wet stiffness and low shrinkage, and high sensitivity to disperse and acid dyes.

Also contemplated are high melting autocondensation polymers, e.g. melting above 275° C., of an aminocarboxylic acid or a lactam or other derivative of such an acid, which polymers have repeating structural units of the formula —NR—Y—CO— wherein R and Y are as defined above. Some specific polyamides melting above 275° C. within this group are polymers of the following: 1-carboxymethyl - 4 - aminocyclohexane or its lactam, 1-carboxy - 4 - aminocyclohexane or its lactam and 1-carboxymethyl-3-aminocyclopentane or its lactam.

The polyurethanes contemplated are polymers having repeating structural units of the formulas

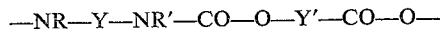
—NR—Y—NR'—CO—O—Y'—CO—O— resulting for example, from the condensation of a diisocyanate with a dihydric alcohol or phenol or the condensation of a diamine with a bis (chloroformate) of a dihydric alcohol or phenol, where the R's and Y's are as described above in connection with the polyamides, and the chemical structure of the polymer and/or the polymerization techniques used are such that a polymer melting above 179° C., preferably above 210° C., is obtained. Particularly preferred are polyurethanes prepared from dihydric alcohols or phenols containing a meta- or para-phenylene or a 1,4-cyclohexylene radical. Some specific polyurethanes which may be used are the condensation product of piperazine with the bis (chloroformate) of bis (p-hydroxyphenyl) propane-2,2, the condensation product of piperazine with the bis (chloroformate) of hydroquinone and the condensation product of tetramethylene diamine with the bis (chloroformate) of butanediol-1,4 each of which has a melting point above 210° C.

Polyureas which may be formed into useful shaped articles in accordance with this invention have repeating structural units of the formula

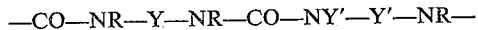
—CO—NR—Y—NR—CO—NY'—Y'—NR— wherein the R's and Y's are as defined above. They may be synthesized, for example, by the addition of a diisocyanate to a diamine, the condensation of a diurethane with a diamine, the condensation of a carbon oxyhalide such as phosgene with a diamine, or by heating an alpha/beta diurea with a diamine, the chemical structure of the polymer and/or the polymerization technique being such that a polymer melting above 179° C., preferably above 210° C. is obtained. Some specific polyureas contemplated are those obtained from the reaction of hexamethylene diisocyanate with hexamethylene diamine and from the reaction of m-phenylene diisocyanate with m-phenylene diamine, each of which polyurea melts above 210° C.

The solutions which are heat treated in accordance with this invention are formed by dissolving the polymer in sulfuric acid of 75 to 100%, preferably 95 to 100% by weight. Fuming sulfuric acid, e.g. containing up to 6 or 7% by weight or even higher of free sulfur trioxide, may also be used. A suitable concentration of the polymer in the solution to be heat treated is, for example, in the range of 5 to 30% by weight.

The heat treatment of this invention may be carried out at any time between the preparation of the dope and the step of forming the solution into useful shaped articles. The heat treated solution may be formed into useful shaped articles such as filaments and films by extruding it through an enclosed space having at least one thin dimension into a coagulating medium, e.g. a liquid coagulant. A suitable concentration of polymer in the spinning solution is in the range, for example, of 5 to 30% by weight and the temperature of the solution which is extruded may be, for example, in the range of 20 to 100° C. In some cases, e.g. where the viscosity of the heat treated solution is higher than is necessary for spinning, it may be desirable to dilute the solution with concentrated sulfuric acid prior to spinning.

A particularly suitable liquid coagulant is an aqueous solution of sulfuric acid having a concentration considerably lower than that of the acid in which the polymer is dissolved and low enough such that the polymer is coagulated into a shaped article. When using aqueous sulfuric acid as the liquid coagulant, the concentration of sulfuric acid in said liquid coagulant, i.e. the spin bath may be varied considerably depending on various modifications of the process. However, such concentration, especially when spinning polyterephthalamides such as polyhexamethylene terephthalamide, will in many cases be below 60% by weight, and, in some cases may be as low as 40%. Moreover, concentrations lower than 40% may be used in some cases. The temperature of the spin bath into which the spinning solution is extruded may be, for example, in the range of 20 to 100° C., preferably 40 to 60° C. Filaments, e.g. of polyterephthalamides such as polyhexamethylene terephthalamide, of particularly desirable properties are obtained using a substantially unmodified spinning system of the foregoing type if the aqueous sulfuric acid of the spin bath has a temperature and concentration within the areas defined by curves A and B of FIGURE 1 of application Serial No. 83,981. However, it is possible in some cases to alter somewhat the shapes and locations of these curves and the other curves of the figure by using various process modifications.

The polymer solutions of this invention may also be wet spun into coagulating or spin baths other than aqueous sulfuric acid. For example at temperatures around 20° C. the sulfuric acid solutions of this invention, e.g. of polyhexamethylene terephthalamide may be extruded into aqueous formic acid of 52 to 68% by weight formic acid concentration or into aqueous acetic acid of 52 to 63% by weight concentration. The solutions may also be extruded into spin baths of aqueous formic or acetic acid of considerably higher temperature e.g. 35 to 55° C. in which case lower acid concentrations may be used.

The heat treated solutions of this invention may be spun at a spinning speed, e.g. at the first takeup roll, of for example, 30 to 150 meters per minute to obtain filaments having a denier in the range, for example of 0.1 to 50.

The process of this invention is particularly suitable in the treatment of solutions of polymers, e.g., polyterephthalamides such as polyhexamethylene terephthalamide, which are prepared by heating solid particles of a polymer precursor, e.g., a salt of a polyamide-forming diamine and dicarboxylic acid such as hexamethylene diammonium terephthalate salt, at a temperature insufficient to completely melt the particles of the reacting mass. In this type of process, the polymerization is generally carried out at a temperature no lower than 55° C. below the melting point of the polymer precursor. In some cases the polymerization may be carried out at substantially the melting point of the precursor although the amount of heating should not at any time be large enough to completely melt the particles of the reacting mass. When polyhexamethylene terephthalamide is being produced from hexamethylene diammonium terephthalate salt, the polymerization may be initiated at a temperature of at least 255° C. preferably above 265° C. and concluded at a temperature, for example, of 270 to 290° C. A method of preparing the polymer utilizing this procedure is disclosed, for example, in application Serial No. 63,718, filed October 20, 1960, by Fontana.

The following examples further illustrate the invention.

Example I

Polyhexamethylene terephthalamide having an inherent viscosity of 1.67 measured as a 0.4% by weight solution in concentrated sulfuric acid at 25° C. and prepared by means of the process disclosed in application Serial No. 63,718, filed October 20, 1960, by Fontana, was dissolved with stirring at room temperature in concentrated sulfuric acid of 97.5% by weight concentration to yield a solution containing 14% of polymer based on the weight of the concentrated sulfuric acid. The solution had a Synchro-Lectric viscosity of 4500 poises at 25° C.

After deaeration by centrifugation the solution was extruded in a horizontal direction through a jet 100 microns in diameter into a spin bath of aqueous sulfuric acid of 49.7% by weight concentration and having a temperature of 47.5° C. The spin bath was contained in an open trough 1 meter long and the spin bath liquid was circulated cocurrent with the direction of extrusion at a velocity between 1 and 2 meters per minute. Mounted adjacent to the spinnerette on each of its sides to prevent turbulence in the vicinity of the latter were two parallel plates of "Plexiglas" each 12 inches long, about 1 inch apart and extending from the bottom of the spin bath trough to a height of 4 inches, which was greater than the height of the jet.

It was found that it was impossible to obtain useful filaments because of plugging in the jet and frequent ruptures of the extruded material.

Example II

The procedure of Example I was followed except that the solution was heated to 100° C. in 5 to 10 minutes by means of an oil bath and kept at that temperature for 1 hour prior to spinning after which it had a viscosity of 1450 poises at 25° C. It was found that this solution could be spun smoothly to yield a filament which was taken up by rolls at the end of the trough away from the spinning jet at a speed of 50 meters per minute. After washing with water until acid free to methyl orange and then drying in warm air in the relaxed state, the filament as spun was found to have a denier per filament of 3.0, a tenacity of 1.84 grams per denier, and an elongation of 88.4%.

Example III

The procedure of Example II was followed except that the solution was kept at a temperature of 100° C. for 4 hours after which it had a viscosity of 990 poises at 25° C. The filament had a denier of 3, a tenacity of 1.74 grams per denier, and an elongation of 77.9%.

It was found that the heat treated solutions of Examples II and III had less of a tendency to plug the pores of a standard filtering medium than the solution of Example I, and that the lower this tendency, the better the spinning stability of the solution, other factors being equal.

Application Serial Nos. 83,981 and 63,718 referred to hereinabove are each assigned to the assignee hereof.

The filaments of the above examples are useful, for example, in the manufacture of woven and knitted fabrics, and for non-textile applications such as the manufacture of tire cord.

It is to be understood that the foregoing detailed description is given merely by way of illustration and that many variations may be made therein without departing from the spirit of my invention.

Having described my invention what I desire to secure by Letters Patent is:

1. A process comprising dissolving at room temperature a poly (polymethylene) terephthalamide, wherein the polymethylene groups contain 2 to 10 carbon atoms in concentrated sulfuric acid having an acid concentration of at least 75% by weight, subjecting the resulting solution to a temperature of 70 to 100° C. for a period of one minute to one week, and subsequently extruding the solution into a spin bath of aqueous sulfuric acid having an acid concentration lower than that of the acid in which the polymer is dissolved such that the polymer is coagulated into a shaped article.

2. The process of claim 1 wherein said polymer is polyhexamethylene terephthalamide.

3. A process comprising subjecting to a temperature of 70 to 100° C. for a period of one minute to one week a solution in concentrated sulfuric acid of at least 75% by weight acid concentration of a poly (polymethylene) terephthalamide, wherein the polymethylene groups contain 2 to 10 carbon atoms, and subsequently extruding the solution into a spin bath of aqueous sulfuric acid having an acid concentration lower than that of the acid in which the polymer is dissolved such that the polymer is coagulated into a shaped article.

4. The process of claim 3 wherein said polymer is prepared by heating solid particles of a polymer precursor, the heat expended being insufficient to completely melt said particles.

5. The process of claim 4 wherein said precursor is hexamethylene diammonium terephthalate salt and said polymer is polyhexamethylene terephthalamide.

6. The process of claim 3 wherein said polymer is polyhexamethylene terephthalamide.

References Cited in the file of this patent

UNITED STATES PATENTS

| | | |
|---|---|---|
| 2,360,406 | Dreyfus et al. | Oct. 17, 1944 |
| 2,489,569 | Foulds et al. | Nov. 29, 1949 |
| 3,040,003 | Beaman | July 19, 1962 |

OTHER REFERENCES

Textbook of Polymer Chemistry, p. 77, by Billmeyer, Jr., pub. by Interscience Publishers, Inc., N.Y. (1957).

Textbook of Polymer Chemistry, p. 35, by Billmeyer, Jr., pub. by Interscience Publishers, Inc., N.Y. (1957).